(12) United States Patent
Chen

(10) Patent No.: US 11,423,128 B2
(45) Date of Patent: Aug. 23, 2022

(54) METHOD FOR SETTING PERMISSION OF USER IN INFORMATION EXCHANGE UNIT IN SYSTEM

(71) Applicant: CHENGDU QIANNIUCAO INFORMATION TECHNOLOGY CO., LTD., Sichuan (CN)

(72) Inventor: Dazhi Chen, Meishan (CN)

(73) Assignee: CHENGDU QIANNIUCAO INFORMATION TECHNOLOGY CO., LTD., Sichuan (CN)

( * ) Notice: Subject to any disclaimer, the term of this patent is extended or adjusted under 35 U.S.C. 154(b) by 111 days.

(21) Appl. No.: 16/633,145

(22) PCT Filed: Jul. 23, 2018

(86) PCT No.: PCT/CN2018/096713
§ 371 (c)(1),
(2) Date: Jan. 22, 2020

(87) PCT Pub. No.: WO2019/019981
PCT Pub. Date: Jan. 31, 2019

(65) Prior Publication Data
US 2020/0201958 A1     Jun. 25, 2020

(30) Foreign Application Priority Data
Jul. 24, 2017   (CN) ........................... 20170608633.4

(51) Int. Cl.
*G06F 21/30* (2013.01)
(52) U.S. Cl.
CPC ...... *G06F 21/30* (2013.01); *G06F 2221/2141* (2013.01)
(58) Field of Classification Search
CPC ............. G06F 21/30; G06F 2221/2141; G06F 21/6245; G06F 3/0637; G06Q 10/103
(Continued)

(56) References Cited

U.S. PATENT DOCUMENTS 8,402,514 B1    3/2013  Thompson et al.
9,224,127 B2 *  12/2015  Nielsen .................. G06Q 10/10
(Continued)

FOREIGN PATENT DOCUMENTS

CN      102468971 A     5/2012
CN      106803138 A     6/2017
(Continued)

OTHER PUBLICATIONS

International Search Report in the international application No. PCT/CN2018/096713, dated Sep. 29, 2018.
(Continued)

*Primary Examiner* — Venkat Perungavoor
*Assistant Examiner* — Peiliang Pan
(74) *Attorney, Agent, or Firm* — Ladas & Parry, LLP

(57) ABSTRACT

A method for setting permissions of a user in a system in an information exchange unit is disclosed in the present invention, including: setting multiple information sections for the information exchange unit; setting participation roles for each information section respectively, wherein the participation role includes one or more roles in the system; and setting permissions of each of the participation roles in the information section, wherein each role is an independent individual not a group/a class, one role can only be related to a unique user during the same period, and one user is related to one or more roles; and creating relations between users and roles in the system. According to the present invention, when an employee changes his/her work content or is transferred from a post, permissions of the employee in an information section of the information exchange unit do not have to be set separately.

10 Claims, 5 Drawing Sheets

(58) Field of Classification Search
USPC .......................................................... 726/17
See application file for complete search history.

(56) References Cited

U.S. PATENT DOCUMENTS

| | | | |
|---|---|---|---|
| 10,728,262 B1* | 7/2020 | Vaswani | H04L 63/1416 |
| 2006/0093095 A1* | 5/2006 | Heck | G06Q 99/00 |
| | | | 379/21 |
| 2007/0016465 A1* | 1/2007 | Schaad | G06Q 10/063114 |
| | | | 705/7.15 |
| 2009/0064280 A1* | 3/2009 | Babeanu | G06Q 10/06 |
| | | | 726/3 |
| 2016/0026717 A1* | 1/2016 | Kelsey | H04L 67/1085 |
| | | | 707/754 |
| 2017/0076288 A1* | 3/2017 | Awasthi | H04L 63/10 |
| 2017/0171212 A1* | 6/2017 | Takada | H04L 9/085 |
| 2017/0295181 A1* | 10/2017 | Parimi | H04L 63/1433 |
| 2018/0144656 A1* | 5/2018 | Mitros | G06Q 10/1093 |
| 2019/0005504 A1* | 1/2019 | Wu | G06Q 20/4016 |

FOREIGN PATENT DOCUMENTS

| | | |
|---|---|---|
| CN | 107480512 A | 12/2017 |
| CN | 107491668 A | 12/2017 |

OTHER PUBLICATIONS

Written Opinion of the International Searching Authority in the international application No. PCT/CN2018/096713, dated Sep. 29, 2018 with English translation provided by Google Translate.

* cited by examiner

METHOD FOR SETTING PERMISSION OF USER IN INFORMATION EXCHANGE UNIT IN SYSTEM

CROSS-REFERENCE TO RELATED APPLICATIONS

This application is the U.S. national phase of PCT/CN2018/096713 filed on Jul. 23, 2018, which claims priority to Chinese Application No. 201710608633.4 filed on Jul. 24, 2017, the disclosures of which are incorporated by reference herein in their entireties.

BACKGROUND

Technical Field

The present invention relates to management software systems such as an ERP, and in particular, to a method for setting a permission of a user in an information exchange unit in a system.

Related Art

Role-based access control (RBAC) is one of the most researched and mature permission management mechanisms for databases in recent years. It is considered to be an ideal candidate to replace conventional mandatory access control (MAC) and discretionary access control (DAC). The basic idea of role-based access control (RBAC) is to divide different roles according to different functional positions in the enterprise organization view, encapsulate the access permission of database resources in roles, and allow users to indirectly access database resources by assigning different roles to the users.

A large number of tables and views are often built in large-scale application systems, which makes the management and permissions of database resources very complicated. It is very difficult for a user to directly manage the access and permissions of the database resources. It requires the user to have a very thorough understanding of the database structure and to be familiar with the use of the SQL language. Once the application system structure or security requirements have changed, a large number of complex and cumbersome permission changes are required, and the security vulnerabilities caused by unexpected authorization errors are very likely to occur. Therefore, designing a simple and efficient permission management method for large-scale application systems has become a common requirement for systems and system users.

The role-based permission control mechanism can manage the access permissions of the system simply and efficiently, which greatly reduces the burden and cost of the permission management of the system, and makes the permission management of the system more compliant with the business management specifications of the application system.

However, the conventional role-based user permission management method adopts the "role-to-user one-to-many" relation mechanism, where the "role" has the nature of a group/a class. That is, one role can simultaneously correspond to/be related to multiple users, and the role is similar to a post/a position/a type of work or other concepts. The permission authorization to a user under this relation mechanism is basically performed by the following three methods: 1. As shown in FIG. 1, the permission is directly authorized to the user, where the disadvantage is that the workload is large and the operation is frequent and cumbersome. 2. As shown in FIG. 2, the role (having the nature of a class/a group/a post/a type of work) is authorized (one role may be related to multiple users), and the user obtains permissions through its role. 3. As shown in FIG. 3, the above two methods are combined.

In the above descriptions, both 2 and 3 need to authorize the role that has the nature of a class/a group. The way of authorization through the role having the nature of a class/a group/a post/a type of work has the following disadvantages: 1. Operations are difficult when the user's permission has changed. In the actual process of using a system, the user's permissions often need to be adjusted during the operation process. For example, in the process of processing the change of employee's permissions, when the permissions of an employee related to the role have changed, it is improper to change the permissions of the entire role due to the change of the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

2. It is difficult to remember the specific permissions contained in a role for a long time. If the role has many permission function points, as time goes by, it is difficult to remember the specific permissions of the role, and it is even more difficult to remember the permission differences between roles with similar permissions. If a new user needs to be related, it is impracticable to accurately determine how to select a relation.

3. Because user permissions change, more roles will be created (if new roles are not created, direct authorization to the user will be increased greatly), and it is more difficult to distinguish specific differences between permissions of the roles.

4. When a user is transferred from a post, if many permissions of the transferred user need to be assigned to other users, distinguishing the permissions of the transferred user and creating roles to relate to the other users respectively are necessary during the processing. Such operations are not only complicated and time-consuming, but also prone to errors.

In an information exchange unit (such as a knowledge base) of the existing management software, a plurality of sections is set. Each section involves information on a different field or a different department. If the permissions of the user in the information section of the information exchange unit in the system cannot be managed effectively in time, the information section of the information exchange unit in the system easily fails to operate normally and effectively. The following existing methods are available for setting permissions. The first method is to directly set permissions for a user. In the case of using the method for directly setting permissions for a user, when the user's work content, post, or other information has changed, information leakage will occur if the permissions of the user in the information section of the information exchange unit fail to be changed in time. For example, a research and development data section, a sales data section, a financial data section, and the like are set in a knowledge base unit. If an employee A in the financial department can download data from the financial data section, and the permissions of the employee A in the knowledge base unit are not modified in time after the employee A is transferred from the financial department to the sales department, the employee A still can download the data from the financial data section after being transferred to the sales department, and can also perform operations on data subsequently added into the financial data section, resulting in the leakage of financial data. In addition, the employee A is also made not to be allowed to download data from the sales data section, thereby affecting his/her normal work.

In actual application, however, many users may exist in one system, and the work content and the posts of the users often change. It is thus difficult to ensure that all the permissions of these users in the information section of the information exchange unit are modified in time, resulting in hidden risks of information leakage. In addition, whenever the work content, post, or the like of a user has changed, the permissions of the user in the information section of the information exchange unit have to be set again, resulting in a huge workload for permission setting.

The second method is to set permissions based on the type of work. Such method for setting permissions based on the type of work is also likely to cause information leakage. For example, when an information exchange unit includes an aircraft business division sales section and a furniture business division sales section. If the permissions are set based on the type of sales work (the above two sections are set as being accessible to employees belonging to the type of sales work), a salesperson in the furniture business division can view the information of the aircraft business division sales section, which leads to information leakage.

The third method is to set the permissions based on the department. Such method for setting permissions based on the department is also likely to cause information leakage. For example, multiple types of work may exist in each department. For example, a sales department includes the following types of work such as a sales engineer, and a clerk who assists the sales engineer in preparing data; and a production department includes the following types of work such as assembly workers, and test workers. If the permissions are set based on the department, the employees belonging to different types of work may have the same permissions in the information exchange unit, which makes it easy to leak information. In another example, when a department includes the following types of work such as staff members, and a supervisor, it is impossible to allow the supervisor to participate only in one section in the information exchange unit.

In addition, some existing information exchange units are not further divided into sections. Consequently, any person permitted to enter the information exchange unit can perform operations on the information in the information exchange unit, such as viewing the information, which makes it very likely to leak the information. For example, a salesperson can view research and development information or the like that is not related to his/her work content in the information exchange unit, which leads to leakage of the research and development information.

Setting management staff: In the case that an individual is set as management staff directly, assuming that Zhang San currently belongs to the type of sales management work and is responsible for the management of the sales section, after Zhang San is transferred to a production post, another employee should take the place of Zhang San to manage the sales section. If permissions are not set in time, Zhang San can not only view subsequent sales or market information data of the company, but also download/modify/delete the data, which will cause information leakage and other losses to the company. On the other hand, if a moderator of this section needs to review uploaded data, because Zhang San has been transferred from this post and ceased of his responsibility for the post, it is unnecessary for Zhang San to review the to-be-reviewed data, and thus the data submitted for review cannot be reviewed in time. Even if a new moderator takes over the work of this section in the future, the new moderator is made to be unable to review the data that is previously uploaded for review, because the task of review remains with Zhang San.

SUMMARY

Technical Problems

The present invention is directed to overcome the disadvantages of the prior art and provide a method for setting permissions of a user in an information exchange unit in a system. When the work content or a post of an employee is changed, it is not necessary to set permissions of the employee in an information section of the information exchange unit separately.

Solutions for Problems

Technical Solutions

The objective of the present invention is fulfilled by the following technical solutions.

A method for setting permissions of a user in an information exchange unit in a system includes:

(1) setting one or more information sections for the information exchange unit;

(2) setting participation roles for each information section respectively, wherein said participation role includes one or more roles in the system; and setting permissions of each of the participation roles in the information section, wherein each role is an independent individual not a group/a class, one role can only be related to a unique user during the same period, and one user is related to one or more roles; and (3) creating relations between users and roles in the system.

Step (1) and step (2) are performed sequentially, and step (3) may be performed before step (1), after step (1), before step (2), or after step (2).

Preferably, the permissions of said role in the information section include a participation permission and/or a management permission.

Preferably, said participation permission includes one or more types of viewing data (content/information), uploading data (content/information), downloading data (content/information), and evaluating data (content/information).

Preferably, said management permission includes one or more types of viewing data (content/information), uploading data (content/information), modifying data (content/information), downloading data (content/information), evaluating data (content/information), archiving data (content/information), de-archiving data (content/information), reviewing data (content/information), and deleting data (content/information) evaluation.

Preferably, said management permission includes at least one level.

Preferably, if a department is selected for a role when or after the role is created, the role belongs to the department, the role is authorized according to the work content of the role, the name of the role is unique in the department, and the number of the role is unique in the system.

Preferably, when said user is transferred from a post, the user's relation to a role corresponding to the original post is canceled, and the user is related to a role corresponding to a new post.

Preferably, one employee corresponds to one user, one user corresponds to one employee, and the employee determines (obtains) his/her permissions in the information exchange unit based on a role related to a user corresponding to the employee; after the employee resigns from a post, the user corresponding to the employee is frozen; and when the employee is re-employed, the user previously corresponding to the employee is unfrozen and serves as a current user corresponding to the employee. During the freezing period, the user cannot serve as the user corresponding to the employee.

Preferably, when an employee corresponding to a user related to a role assigned with a management permission reviews data, a data pass rate within a specified time is obtained by dividing the number of persons who have given review results and have passed the review by the total number of persons who have given review results. The review manner described above may also be a review and approval manner.

A method for setting permissions of a user in an information exchange unit in a system includes: setting one or more information sections for the information exchange unit; setting permissions of a role in the system in each information section, wherein each role is an independent individual not a group/a class, one role can only be related to a unique user during the same period, and one user is related to one or more roles; and creating relations between users and roles in the system.

Beneficial Effects of the Invention

Beneficial Effects

The present invention has the following beneficial effects: (1) in the present invention, the user's permissions in the information section of the information exchange unit are set based on a role. When a user is transferred from a post, the relation of the user to the role corresponding to the original post is canceled, and the user is related to a role corresponding to a new post. The user's permissions in the information section of the information exchange unit are changed when the working permissions of the user are changed, and the permissions in the information section of the information exchange unit do not need to be changed for the user separately. This not only ensures that the user's permissions in the information section of the information exchange unit are updated in time, but also greatly reduces the workload of setting the user's permissions in the information section of the information exchange unit.

For example, the work content of an employee A includes product development and product sales. The work content of a role 1 is product development, and the role 1 has permissions to view data, download data, and upload data in a research and development data section. The work content of a role 2 is product sales, and the role 2 has permissions to view data, download data, and upload data in a sales data section. The work content of a role 3 is product manufacturing, and the role 3 has permissions to view data, download data, and upload data in a product manufacturing data section. By relating the role 1 and the role 2 only to a user corresponding to the employee A, not only the work content of the employee A is authorized, but also the employee A is permitted to view data, download data, and upload data in the research and development data section and the sales data section. To adjust the work content of the employee A to product development only, it is only necessary to cancel the relation of the user 2 to the user corresponding to the employee A, and meanwhile, the work content of the employee A and his/her permissions in the information section of the information exchange unit are adjusted. To adjust the work content of the employee A to product manufacturing, it is only necessary to cancel the relation of the role 1 and the role 2 to the user corresponding to the employee A, and to relate the user corresponding to the employee A to the role 3, and meanwhile, the work content of the employee A and his/her permissions in the information section of the information exchange unit are adjusted.

(2) The information exchange unit in the present invention includes a plurality of information sections. The permissions of a role in each information section are set respectively, so as to restrict the participation roles in each information section, and further restrict the participation permissions of the user in each information section and prevent the information in each information section from being leaked to unrelated persons.

(3) The conventional permission management mechanism defines the role as the nature of a group, a type of work, a class or the like. The role is in a one-to-many relation to the user. In the actual process of using a system, the user's permissions often need to be adjusted during the operation process. For example, in the process of processing the change of employee's permissions, when the permissions of an employee related to the role have changed, it is improper to change the permissions of the entire role due to the change in the permissions of the individual employee, because this role is also related to other employees whose permissions remain unchanged. To deal with this situation, either a new role is created to fit the employee whose permissions have changed, or permissions are directly authorized to the employee (disengaged from the role) based on permission requirements. The above two processing methods not only take a long time but also cause mistakes easily for the role authorization in the case of a large number of role permissions. It is cumbersome for a user to operate, and errors occur easily, resulting in loss to the system user.

However, under the method of the present application, as the role is an independent individual, the objective can be achieved by changing the permissions of the role. Although the method in the present application seems to increase the workload during system initialization, by means of copying or the like, the role can be created or authorized more efficiently than the conventional roles having the nature of a group. As it is unnecessary to consider the commonality of the roles having the nature of a group when satisfying the related users, the solutions in the present application make the permission setting clear and explicit. Especially after the system has been used for a period of time (after the permissions of the user/role have changed dynamically), the solutions in the present application can significantly improve the permission management efficiency for the system user in using the system, make the dynamic authorization simpler, more convenient, clearer and more explicit, and improve the efficiency and reliability of the permission setting.

(4) The conventional role authorization method with the nature of a group is prone to errors. The method provided by the present application significantly reduces the probability of authorization errors, because the method of the present application only needs to consider the role as an independent individual, without considering the commonality of multiple users related to the role having the nature of a group under the conventional method. Even if the authorization errors occur, only the user related to the role is affected. However, in the case of the conventional role having the nature of a group, all users related to the role are affected. Even if the authorization errors occur, the correction method of the present application is simple and takes a short time, while in the case of the conventional role having the nature of a group, the commonality of the permissions of all users related to the role needs to be considered during the error correction. The modification is cumbersome, complex, and error-prone when there are many function points, and in many cases, the problem cannot be solved unless a new role is created.

(5) In the conventional group-based role authorization method, if the role has many permission function points, as time goes by, it is difficult to remember the specific permissions of the role, and it is even more difficult to remember the permission differences between roles with similar permissions. If a new user needs to be related, it cannot be accurately determined how to select a relation. In the method of the present application, the role itself has the nature of a post number/a station number, such that the selection can be made easily.

(6) When a user is transferred from a post, if many permissions of the transferred user need to be assigned to other users, in processing, it is necessary to distinguish the permissions of the transferred user and create roles to be related to other users respectively. Such operations are complicated, time-consuming, and also prone to errors.

The method of the present application is as follows: The transferred user is related to several roles. When the user is transferred from a post, the relation of the user to the roles in the original department is first canceled (the canceled roles may be re-related to other users), and then the user is related to a role in a new department. The operation is simple and not error-prone.

(7) When or after a role is created, a department needs to be selected, and then the department to which the role belongs cannot be replaced. Reasons why the department to which the role belongs cannot be replaced are as follows. Reason 1: As the role in the present application is equivalent to a station number/a post number in nature, different station numbers/post numbers have different work content or permissions. For example, the role of a salesperson 1 in a sales department and the role of a developer 1 in a technical department have two completely different station numbers or post numbers, and have different permissions. Reason 2: If the department (sales department) to which the role of the salesperson 1 belongs is replaced by the technical department without changing the permissions of the role of the salesperson 1, the role that owns the permissions of the sales department exists in the technical department. This leads to management confusion and security vulnerabilities.

BRIEF DESCRIPTION OF THE DRAWINGS

Description of the Drawings

Figure 1:
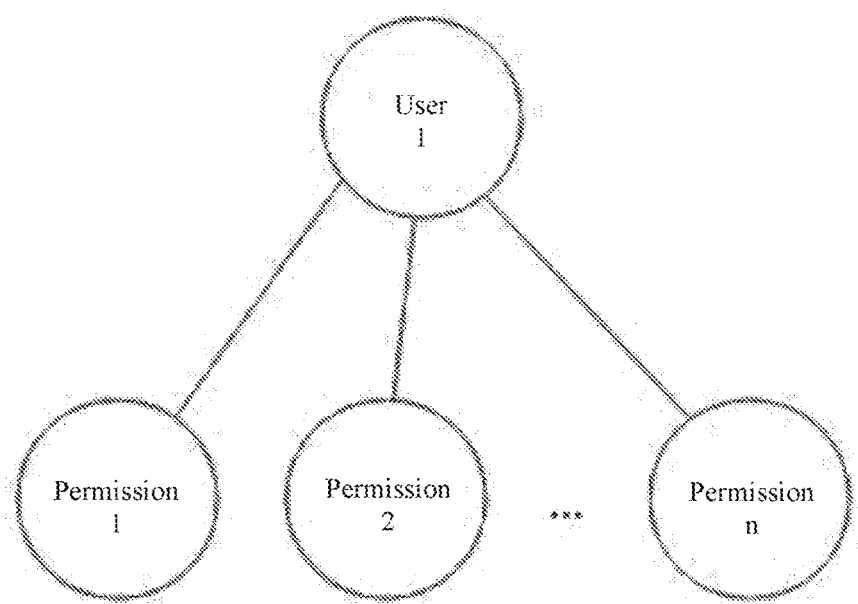
Figure 2:
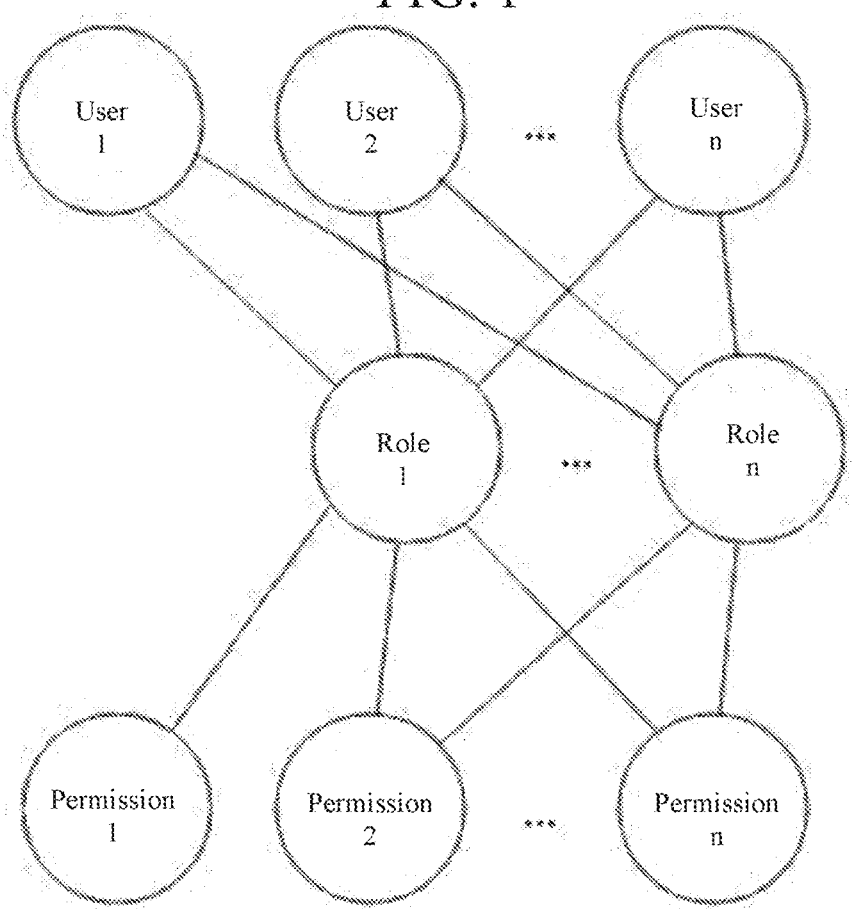
Figure 3:
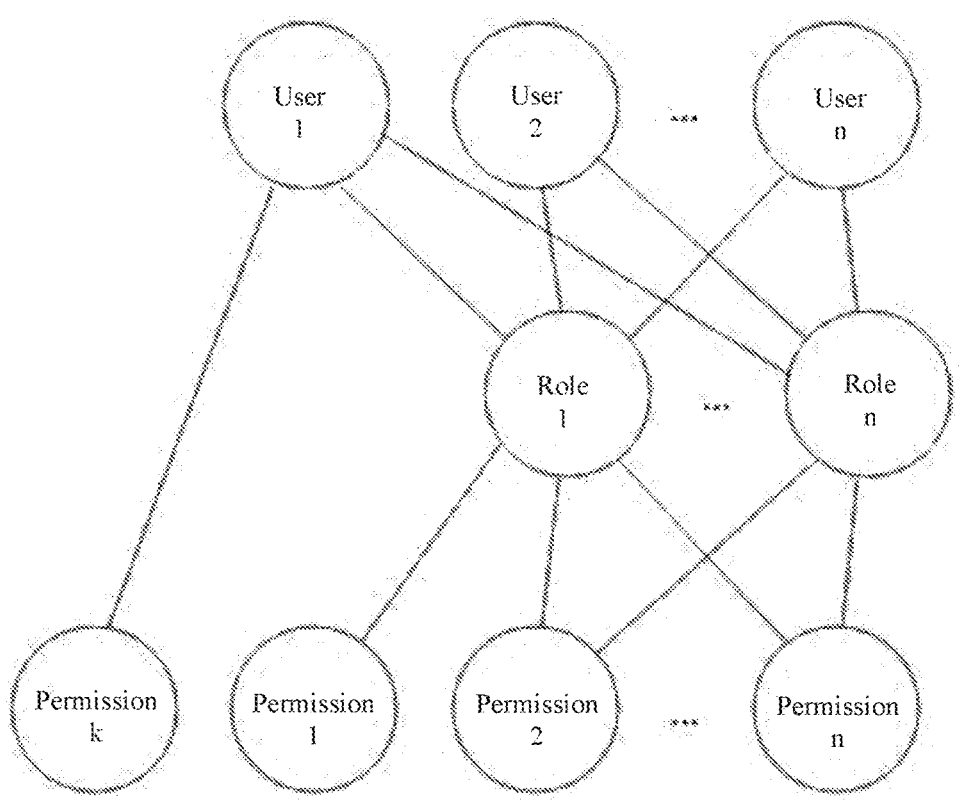
Figure 4:
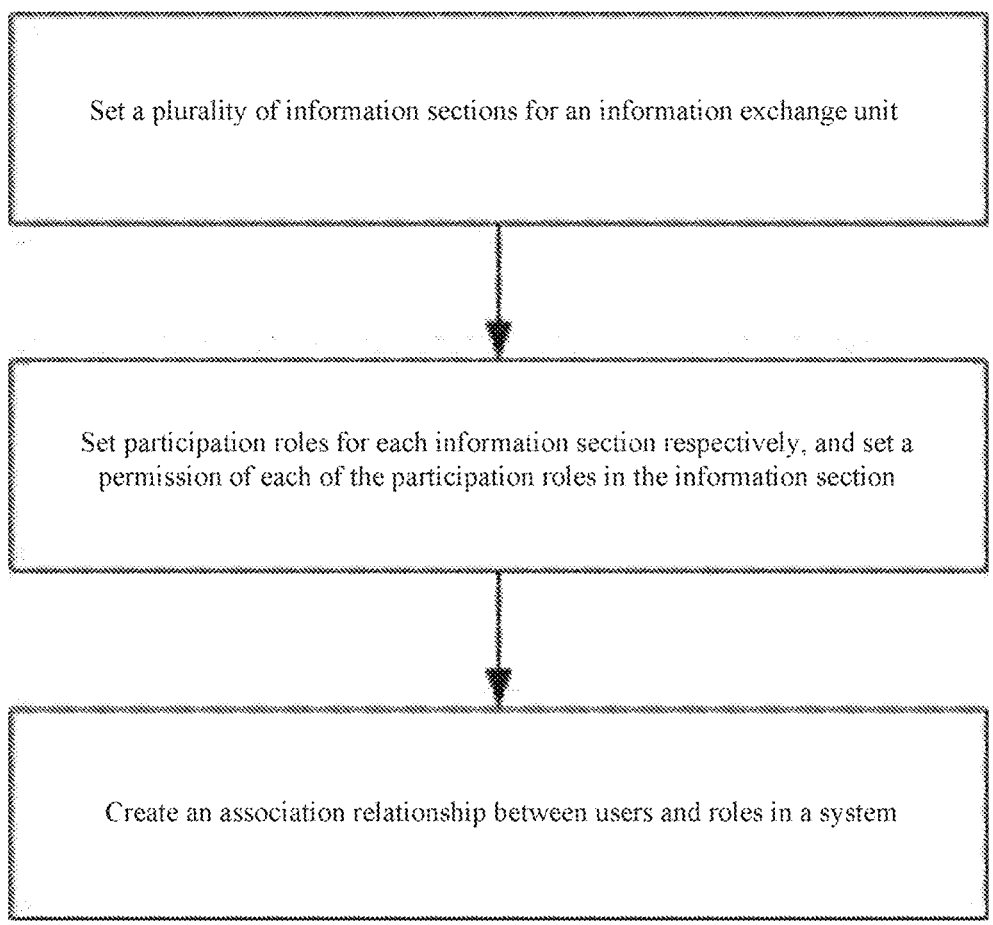
Figure 5:
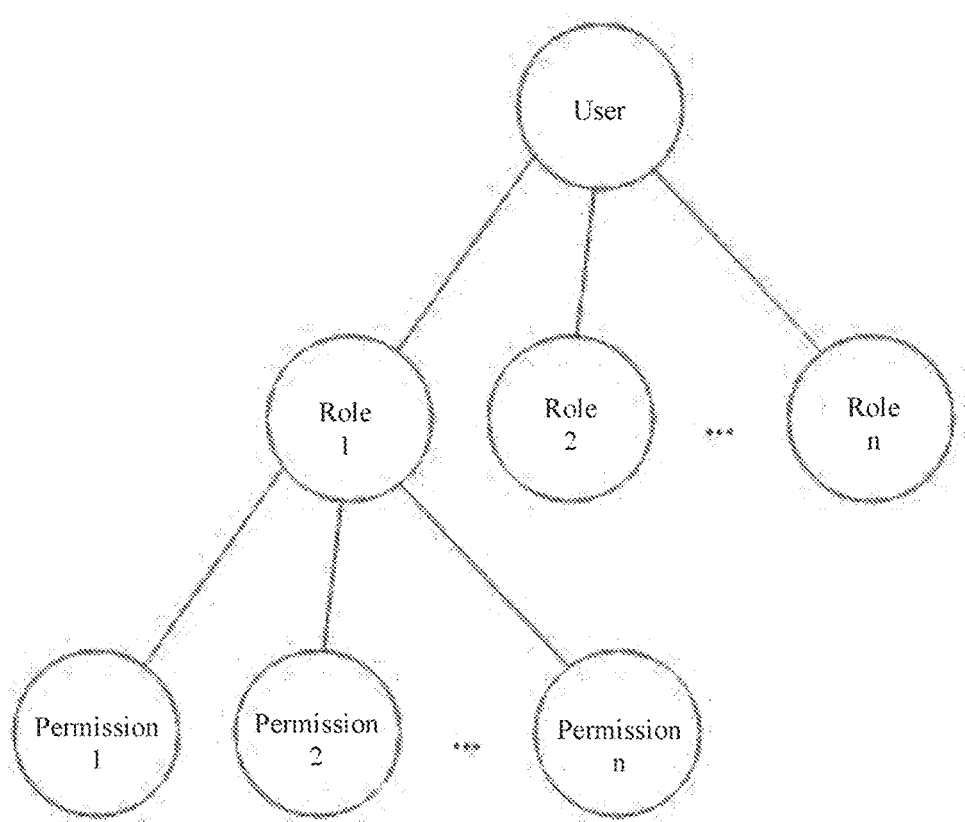
Figure 6:
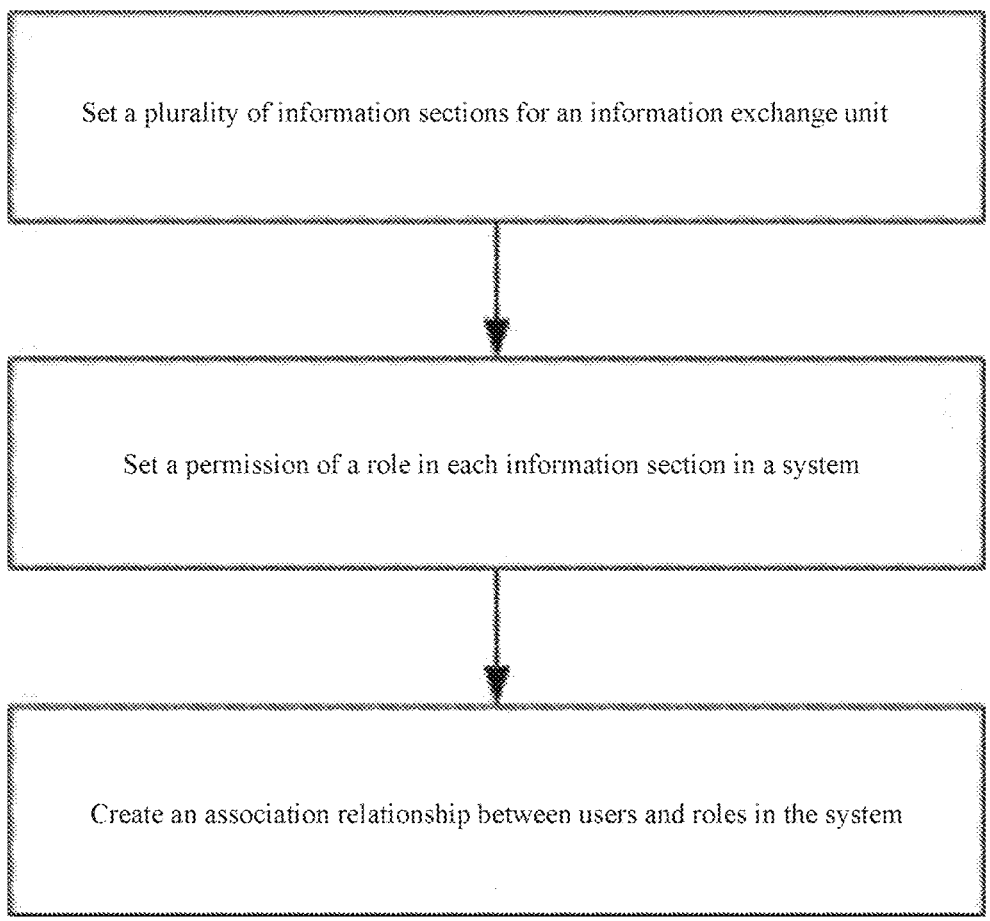

FIG. 1 is a schematic diagram in which a system directly authorizes a user in the prior art;

FIG. 2 is a schematic diagram in which a system authorizes a role having the nature of a group/a class in the prior art;

FIG. 3 is a schematic diagram in which a system both directly authorizes a user and authorizes a role having the nature of a group/a class in the prior art;

FIG. 4 is a flowchart of an embodiment in the present invention;

FIG. 5 is a schematic diagram in which a system authorizes a user based on a role having the nature of an independent individual according to the present invention; and FIG. 6 is a flowchart of another embodiment in the present invention.

DETAILED DESCRIPTION

Description of the Embodiments

The technical solutions of the present invention will be further described in detail below with reference to the figures, but the protection scope of the present invention is not limited to the following descriptions.

Embodiment 1

As shown in FIG. 4, a method for setting permissions of a user in an information exchange unit in a system includes: setting a plurality of information sections (or information categories) for the information exchange unit, for example, setting an electrical section, a mechanical section, a chemical industry section, a financial section, a management section, and the like in a knowledge base; and setting participation roles for each information section respectively, wherein the participation role includes one or more roles in the system; and setting permissions of each of the participation roles in the information section, wherein each role is an independent individual not a group/a class, one role can only be related to a unique user during the same period, and one user is related to one or more roles; that is, for each information section, selecting one or more roles among the roles in the system as the participation roles of the information section, and setting the permissions of each of the participation roles in the information section.

As shown in FIG. 5, the role is an independent individual not a group/a class. One role can only be related to a unique user during the same period, and one user is related to one or more roles. When or after the role is created, a department is selected for the role, so that the role belongs to the department. The role is authorized according to its work content, the name of the role is unique in the department, and the number of the role is unique in the system.

Definition of a role: A role does not have the nature of a group/a class/a category/a post/a position/a type of work or the like, but has non-collective nature. The role is unique and is an independent individual. Applied in an enterprise or an institution, the role is equivalent to a post number (the post number herein is not a post, and one post may have multiple employees at the same time, but one post number can only correspond to one employee during the same period).

For example, in a company system, the following roles may be created: a general manager, a deputy general manager 1, a deputy general manager 2, a manager of Beijing sales department I, a manager of Beijing sales department II, a manager of Beijing sales department III, a Shanghai sales engineer 1, a Shanghai sales engineer 2, a Shanghai sales engineer 3, a Shanghai sales engineer 4, a Shanghai sales engineer 5, and so on. The relation between users and roles is as follows: if Zhang San, the company's employee, serves as a deputy general manager 2 of the company and also serves as a manager of Beijing sales department I, the roles to which Zhang San needs to be related are the deputy general manager 2 and the manager of Beijing sales department I, and Zhang San owns the permissions of the two roles.

The concept of conventional roles is a group/a class/a post/a position/a type of work in nature, and one role can correspond to multiple users. However, in the present application, the concept of "role" is equivalent to a post number/a station number, and is also similar to the role in a film and television drama: one role (in childhood, juvenile, middle-age . . . ) can be played by only one actor or actress during the same period, but one actor or actress may play multiple roles.

When the user is transferred from a post, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

The permissions of the role in the information section include a participation permission and/or a management permission, so that the users in the information section may be divided into participants and managers in the information section of the information exchange unit. Different permissions are assigned to the participants and the managers respectively (a participation permission is assigned to a participant, and a management permission is assigned to a manager), which helps to maintain the normal operation of the information section of the information exchange unit.

Said participation permission includes one or more types of viewing data, uploading data, downloading data, evaluating data, and the like. Further, the participation permission includes at least a data viewing permission.

Said management permission includes one or more types of viewing data, uploading data upload, modifying data, downloading data, evaluating data, archiving data, de-archiving data, reviewing data, deleting data evaluation, and the like.

One employee corresponds to one user, one user corresponds to one employee, and an employee determines (obtains) permissions based on the role related to the user corresponding to the employee.

Said management permission includes at least one level. For example, the management permission includes two levels, of which one is an ordinary management permission, and the other is a special management permission. An employee corresponding to the ordinary management permission manages the corresponding information section (for example, reviews the data), and an employee corresponding to the special management permission supervises the quality of the management performed by the employee corresponding to the ordinary management permission on the corresponding information section.

When an employee corresponding to a role assigned with a management permission reviews data (such as uploaded data), a data pass rate within a specified time (the specified time is user-definable) is obtained by dividing the number of persons who have given review results and have passed the review by the total number of persons who have given review results. When the data pass rate is greater than or equal to a set value, the review is passed. Otherwise, the review fails. This greatly shortens the period of data review.

Further, the content of the ordinary management permission includes one or more types of viewing data, reviewing data, deleting data, and deleting data evaluation, and one or more types of uploading data, downloading data, and evaluating data. The content of the special management permission includes one or more types of viewing data, archiving data, de-archiving data, uploading data, downloading data, evaluating data, reviewing data, deleting data, and deleting data evaluation. The data archiving is to hide the data (including the relevant information on data evaluation, and the like). After the data is archived, only the employees corresponding to the special management permission can perform operations such as viewing on the data, and the employees corresponding to the ordinary management permission and the participation permission cannot view the archived data. The data de-archiving is to resume the display of the archived data, and the de-archived data is restored to the last state before archiving.

The method further includes a step of creating relations between users and roles in the system.

Embodiment 2

As shown in FIG. 6, a method for setting permissions of a user in an information exchange unit in a system includes: setting a plurality of information sections (or information categories) for the information exchange unit, for example, setting an electrical section, a mechanical section, a chemical industry section, a financial section, a management section, and the like in a knowledge base; and setting permissions of a role in the system in each information section, wherein each role is an independent individual not a group/a class, one role can only be related to a unique user during the same period, and one user is related to one or more roles.

The role is an independent individual not a group/a class. One role can only be related to a unique user during the same period, and one user is related to one or more roles. When or after the role is created, a department is selected for the role, so that the role belongs to the department. The role is authorized according to its work content, the name of the role is unique in the department, and the number of the role is unique in the system.

When the user is transferred from a post, the user's relation to the role in the original department is canceled, and the user is related to a role in a new department. After the role is created, a user may be related to the role in the process of creating the user, or may be related to the role at any time after the user is created. After the user is related to the role, the user can be released from the relation to the role at any time, and the relation between the user and another role may be created at any time.

The permissions of the role in the information section include a participation permission and/or a management permission, so that the users in the information section may be divided into participants and managers in the information section of the information exchange unit. Different/corresponding permissions are assigned to the participants and the managers respectively (a participation permission is assigned to a participant, and a management permission is assigned to a manager), which helps to maintain the normal operation of the information section of the information exchange unit.

Said participation permission includes one or more types of viewing data, uploading data, downloading data, and evaluating data. Further, the participation permission includes at least a data viewing permission.

Said management permission includes one or more types of viewing data, uploading data upload, modifying data, downloading data, evaluating data, archiving data, de-archiving data, reviewing data, and deleting data evaluation.

One employee corresponds to one user, one user corresponds to one employee, and an employee determines (obtains) permissions based on the role related to the user corresponding to the employee.

Said management permission includes at least one level. For example, the management permission includes two levels, of which one is an ordinary management permission, and the other is a special management permission. The employee corresponding to the ordinary management permission manages the corresponding information section, and the employee corresponding to the special management permission supervises the quality of the management performed by the employee corresponding to the ordinary management permission on the corresponding information section.

The content of the ordinary management permission includes one or more types of viewing data, uploading data, downloading data, evaluating data, reviewing data, deleting data, and deleting data evaluation. The content of the special management permission includes one or more types of viewing data, uploading data, downloading data, evaluating data, archiving data, de-archiving data, reviewing data, deleting data, and deleting data evaluation. The data archiving is to hide the data. After the data is archived, only the employees corresponding to the special management permission can perform operations such as viewing on the data, and the employees corresponding to the ordinary management permission and the participation permission cannot view the archived data. The data de-archiving is to resume the display of the archived data, and the de-archived data is restored to the last state before archiving.

The method further includes a step of creating relations between users and roles in the system.

The above is only preferred embodiments of the present invention, and it should be understood that the present invention is not limited to the forms disclosed herein, and is not to be construed as excluding the other embodiments, but may be used in various other combinations, modifications and environments. Modification can be made by the techniques or knowledge of the above teachings or related art within the scope of the teachings herein. All changes and modifications made by those skilled in the art without departing from the spirit and scope of the present invention are intended to be within the protection scope of the appended claims.

What is claimed is:

1. A method for setting one or more permissions of a user in an information exchange unit in a system, comprising:
    setting one or more information sections for the information exchange unit;
    setting one or more roles for an information section; and configuring one or more permissions for each of the one or more roles in the information section; and
    creating relations between the user and the one or more roles in the system, wherein each role is independent which is not a group or a class, and one role is configured to be related to the user only during a same period, and the user is configured to be related to the one role or more roles.

2. The method according to claim 1, wherein the one or more permissions for each of the one or more roles in the information section comprise a participation permission and/or a management permission.

3. The method according to claim 2, wherein said participation permission comprises one or more of viewing data, uploading data, downloading data, or evaluating data.

4. The method according to claim 2, wherein said management permission comprises one or more of viewing data, uploading data, modifying data, downloading data, evaluating data, archiving data, de-archiving data, reviewing data, or deleting data evaluation.

5. The method according to claim 4, wherein when an employee corresponding to a user related to a role assigned with a management permission reviews data, a data pass rate within a specified time is obtained by dividing the number of persons who have given review results and have passed the review by the total number of persons who have given review results.

6. The method according to claim 2, wherein said management permission comprises at least one level.

7. The method according to claim 1, wherein when a department is selected for a role when or after the role is created, the role belongs to the department, the role is authorized according to the work content of the role, the name of the role is unique in the department, and the number of the role is unique in the system.

8. The method according to claim 1, wherein when said user is transferred from a post, the user's relation to a role corresponding to the original post is canceled, and the user is related to a role corresponding to a new post.

9. The method according to claim 1, wherein one employee is configured to correspond to one user, one user is configured to correspond to one employee, and an employee is configured to determine one or more permissions based on one or more roles related to the one user corresponding to the employee.

10. A method for setting one or more permissions of a user in an information exchange unit in a system, comprising:
    setting one or more information sections for the information exchange unit;
    setting one or more permissions for a role in the system comprised in the one or more information sections, wherein each of the information section comprise one or more roles, and each role is independent which is not a group or a class; and
    creating relations between the user and roles in the system, wherein one role is configured to be related to the user only during a same period, and the user is configured to be related to the one or more roles.

* * * * *